April 7, 1953

R. G. PIETY 2,634,398

METHOD OF ELIMINATING AN UNDESIRED
COMPONENT OF SEISMIC WAVES
Filed Nov. 24, 1950

INVENTOR.
R. G. PIETY

BY

*Hudson & Young*
ATTORNEYS

Patented Apr. 7, 1953

2,634,398

UNITED STATES PATENT OFFICE 2,634,398

METHOD OF ELIMINATING AN UNDESIRED COMPONENT OF SEISMIC WAVES

Raymond G. Piety, Bartlesville, Okla., assignor to Phillips Petroleum Company, a corporation of Delaware Application November 24, 1950, Serial No. 197,430

8 Claims. (Cl. 340—1)

This invention relates to a method of eliminating an undesired component of seismic waves. In one specific aspect, it relates to a method of eliminating signals representative of surface waves from the output of a seismic prospecting system.

In seismic prospecting, an explosive charge is detonated at a location referred to as the shot point, this detonation producing seismic waves which, in general, can be divided into two classes. One class includes the waves which penetrate a substantial distance below the surface and are reflected in part, refracted in part, and absorbed in part, by the subterranean strata, the reflected and refracted waves being picked up at a plurality of locations remote from the shot point and converted into electrical voltages representative thereof. This class of waves yields useful information concerning the subterranean strata. The second class of waves, referred to as surface waves, Rayleigh waves or ground roll, travel along the surface of the earth and produce unwanted disturbances at the seismeter stations.

I have discovered a method whereby the unwanted disturbances produced by surface waves can be substantially or completely eliminated, the method of my invention also being useful in cases where it is desired to cancel out the reflected and refracted waves as when making a study of surface wave phenomena.

It is an object of the invention to provide a method of substantially or completely removing unwanted components from seismic waves.

It is a further object to provide a method of substantially or completely eliminating the effects of surface waves in a seismic prospecting system.

It is a still further object to provide a method which greatly increases the accuracy of seismic prospecting without adding substantially to the cost thereof.

Various other objects, advantages and features of the invention will become apparent from the following detailed description taken in conjunction with the accompanying drawings in which.

Figure 1:
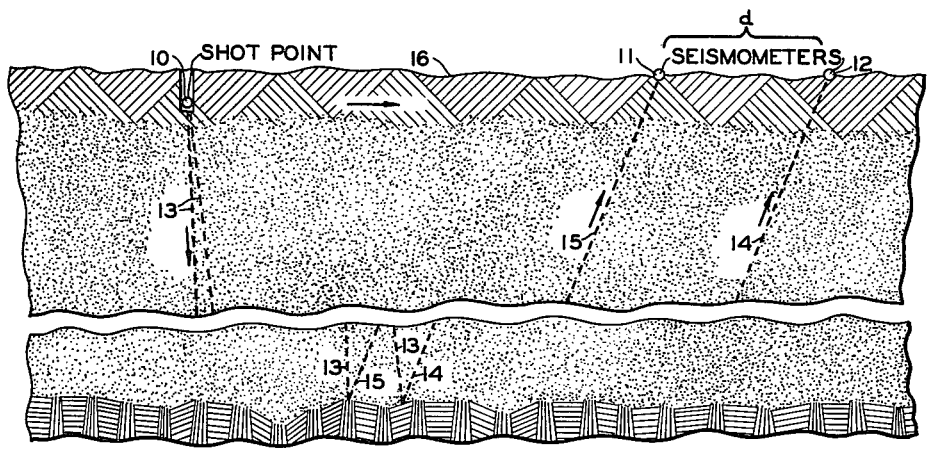
Figure 1 is a schematic view of a seismic prospecting layout showing the shot point and two seismometers.

Referring to Figure 1, an explosive charge is detonated at a shot point 10, a portion of the seismic waves thus produced penetrating the subterranean strata and being reflected or refracted therefrom to the two seismometers 11 and 12, the paths of these waves being generally indicated by the dotted lines 13, 14 and 15. Responsive to the detonation of the charge at the shot point 10, surface waves traverse the upper layers or strata preceding from the shot point to the seismometers 11, 12 in a straight path.

Figure 2:
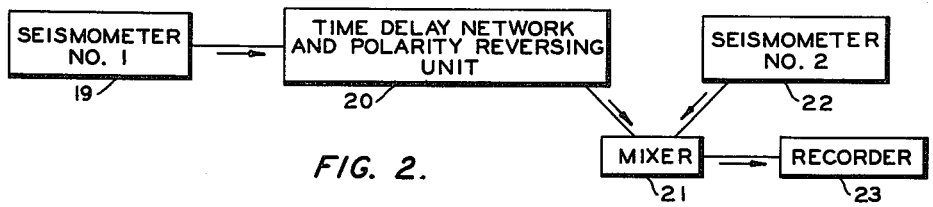
Figure 2 is a block diagram of a suitable circuit for carrying out the method of my invention.

I have discovered that the surface waves having a characteristic dominant frequency in the neighborhood of 10 cycles per second while the reflected and refracted waves consist substantially of components of higher frequencies. I have also discovered that it is possible to determine the velocity of travel both of the surface waves and of the reflected and refracted waves by making a few experimental shots in the locality where the prospecting is carried out. In accordance with this invention, by mixing the outputs of the seismometers at locations 11 and 12, and by providing a suitable time delay network and polarity reversing unit, the effect of the surface waves is substantially or wholly suppressed while the amplitude of the reflected and refracted waves is actually increased, thus providing a great improvement in the relative amplitudes of the desired reflected and refracted waves with respect to the surface waves. Suitable circuits for accomplishing the purposes of my invention are shown in block diagram by Figure 2 wherein the output of a seismometer 19 at location 11 is fed through a time delay network and polarity reversing unit 20 to a mixer 21 where the impulse from the unit 20 is combined with the output of a seismometer 22 at location 12, the mixed output being fed to a recorder 23.

In accordance with the method of my invention, the network 20 provides a time delay equal to the time required for the surface waves to traverse the distance $d$ between the seismometer stations 11 and 12. Therefore, when the delayed waves are reversed in polarity and mixed with the output of seismometer 22, the surface wave components are of equal magnitude and opposite polarity so that they cancel each other out. The distance $d$ is further adjusted so that the corresponding time delay and polarity reversal of the reflected and refracted waves produced by unit 20 causes them to reinforce each other. This is done by adjusting the distance $d$ so that the corresponding time delay equals an odd number of half-cycles at the dominant frequency of the reflected and refracted waves. In this connection, it will be noted that the reflected and refracted waves arrive, for all practical purposes, in phase at the seismometers 19 and 22 due to the long path traversed by these waves. Consequently, when one seismometer output is delayed an odd number of half-cycles and its polarity is reversed, it reinforces the output of the other seismometer.

Figure 4A:
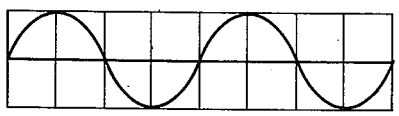
Figures 4a, 4b, and 4c are graphs showing features of the invention.
Figure 4B:
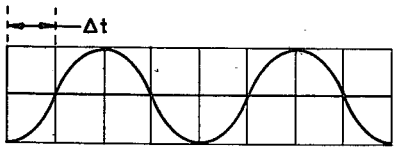
Figure 4C:
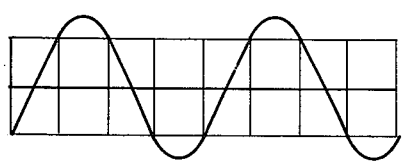

Expressed mathematically, the seismometers 11, 12 are spaced apart a distance $d$ computed by the formula:

$$d = \frac{V_0(1+2n)}{2f_0}$$

where $V_0$ is the velocity of the surface wave, $f_0$ is the frequency of the dominant reflected signal and $n$ is a positive integer or zero. The time delay network, which can be of any suitable type, delays the reflected signals from seismometer 19, which can have a typical wave form as shown by Figure 4a, at location 11 by an interval $$\Delta = t\frac{(1+2n)}{2f_0}$$

and is then reversed in polarity, as by reversing the leads connecting the time delay network to the mixer, thus producing the wave of Figure 4b. The reversal of polarity by the unit 20 produces, in effect, a 180° phase shift between the inverted output of seismometer 19 and the output of seismometer 22. However, the time delay network, by delaying the reflected signal for the interval $$\frac{(1+2n)}{2f_0}$$

in effect, produces an additional 180° phase shift so that the reflected waves reinforce each other, as shown in Figure 4c, when the altered output of seismometer 19 is mixed with the output of seismometer 22 in the mixer 21.

The surface waves, however, do not arrive at the location 11, 12 in phase due to their horizontal path rather than the almost vertical path of the reflected and refracted waves. Since the unit 20 produces a delay equal to the time required for the surface waves to travel from station 11 to station 12, and the delayed signal opposes the output of seismometer 22, the surface wave component is cancelled in the mixer 21 so that the output fed to the recorder is substantially or wholly free from voltages representative of surface waves. Thus, a substantial improvement is made in the relative amplitude of the desired reflected and refracted wave signals relative to the signals resulting from surface waves.

It will be evident that if the polarity reversing network is removed from unit 20, the surface wave signals will reinforce each other but the reflected and refracted waves will be substantially or wholly eliminated. Although the surface wave component is not of interest in seismic prospecting, valuable results are obtained by operating my method in this manner in conducting research work as to the causes and nature of surface waves.

Figure 3:
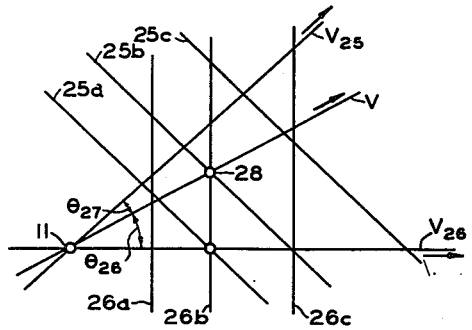
Figure 3 is a view of a system where there are a plurality of interfering waves.

In some cases interfering surface waves may be moving in two directions. For reflected waves with a wavefront advancing normal to the surface, the apparent velocity is very large. For the surface wave fronts 25, 26 advancing as shown in Figure 3 the velocity on the surface is $$V = \frac{V_0}{\cos \theta}$$

where $V_{25}$ and $V_{26}$ are the directions along which the waves have minimum apparent velocity and $\theta_{26}$, $\theta_{27}$ are the angles between a reference line V and the waves represented by lines $V_{26}$ and $V_{25}$, respectively. This is ordinarily called the direction in which the wave is moving. The reflected wavelets which it is desirable to receive have the appearance of Figure 4a so that it is desired to delay one seismometer with respect to the other by $\Delta t = P$ seconds to eliminate surface waves in the manner already indicated with desirable strengthening of the reflected waves. The two velocities $V_{25}$ and $V_{26}$ are shown in Figure 3. The surface velocity $V_{25}$ is greater than $V_{26}$ so that $V_1\Delta t > V_2\Delta t$. The lines 25 represent the wave front of $V_{25}$ and the lines 26 represent the wave front of $V_{26}$. If a seismometer is placed at location 11 then the other seismometer must be placed at location 28 where the wave fronts of equal time delay after passing location 11 intersect to allow the desired wave to be strengthened while eliminating both of the surface waves. This system is most advantageous if the two waves are in the same quadrant. If the two waves are in different quadrants, then the spacing between seismometers becomes large.

When $V_1$ and $V_2$ are 180° apart, that is, one wave is going in the opposite direction to the other, then there is no position for the two seismometers which will eliminate the undesired waves. It is possible to avoid this difficulty by an extension of the method for two seismometers to a larger number of seismometers. Thus, it is possible, in an obvious manner, to neutralize still more waves in many directions (3 dimensional if desired) by compounding the seismometers in pairs as was done in going from one wave to two, that is, from Figure 1 to Figure 3. Where two pairs are used, a single seismometer may function as one unit of each pair.

While the invention has been described in connection with present, preferred embodiments thereof, it is to be understood that this description is illustrative only and is not intended to limit the invention, the scope of which is defined by the appended claims.

I claim:

1. A method for eliminating unwanted signals from the output of a seismic recording system which comprises producing electrical signals representative of seismic waves at a first location and at a second location, said signals having components of different dominant frequencies, mixing said signals to produce a resultant signal, and delaying one of said signals for an interval equal to the time required for waves of one dominant frequency to traverse the distance between said locations.

2. A method for eliminating unwanted signals from the output of a seismic recording system, which comprises producing electrical signals representative of seismic waves at a first location and at a second location, said signals having components of different dominant frequencies, inverting one of said signals, mixing said inverted signal with the other signal to produce a resultant signal, and providing a time delay for one of said signals for an interval equal to the time required for waves of one dominant frequency to traverse the distance between said locations.

3. A method for eliminating voltages representative of surface waves from the output of a seismic recording system which comprises detonating an explosive charge at a shot point, thereby producing surface waves traversing the upper strata of the earth and waves reflected from subterranean strata, producing an electrical voltage representative of seismic waves at a first location spaced from the shot point, producing electrical voltages representative of seismic waves at a second location spaced from the shot point at a greater distance than said first location, the distance between said locations being represented by the following equation:

$$d = \frac{V_0(1+2n)}{2f_0}$$

where $d$ is the distance between said locations, $V_0$ is the velocity of the surface waves, $f_0$ is the dominant frequency in cycles per second of the reflected signal and $n$ is a positive integer or zero, delaying the voltage produced at said first location for an interval $$\frac{(1+2n)}{2f_0}$$

seconds to cause the surface wave signal at the first location to oppose the surface wave signal produced at the second location, inverting the delayed signal, and mixing the inverted signal with the signal produced at the said second location to provide a resultant signal, and recording said resultant signal.

4. A method for eliminating voltages representative of surface waves from the output of a seismic recording system which comprises detonating an explosive charge at a shot point, thereby producing a plurality of surface waves traversing the upper strata of the earth in different directions and waves reflected from subterranean strata, producing an electrical voltage representative of seismic waves at a first location spaced from the shot point, producing electrical voltages representative of seismic waves at a second location spaced from the shot point at a greater distance than said first location, the distance between said locations being represented by the following equation:

$$d = \frac{V_0(1+2n)}{2f_0}$$

where $d$ is the distance between said locations, $V_0$ is the velocity of the surface waves, $f_0$ is the dominant frequency of the reflected signal and $n$ is a positive integer or zero, said second location being positioned at the intersection of two lines normal to the respective directions of said two surface waves at distances representing equal travel times from said first location, delaying the voltage produced at said first location for an interval sufficient to cause the surface wave signal at the first location to oppose the surface wave signal produced at the second location, inverting the delayed signal, and mixing the inverted signal with the signal produced at the said second location to provide a resultant signal, and recording said resultant signal.

5. A method for eliminating unwanted signals from the output of a seismic recording system, which comprises producing electrical signals representative of seismic waves at a first location and a second location, said signals having components of different dominant frequencies, said locations being spaced a distance equal to the velocity of the wave having one dominant frequency multiplied by the time interval corresponding to an odd number of half waves with respect to the other of said dominant frequencies, mixing said signals to produce a resultant signal, and delaying one of said signals for said time interval corresponding to an odd number of half waves with respect to the other of said dominant frequencies.

6. A method for eliminating unwanted signals from the output of a seismic recording system, which comprises producing electrical signals representative of seismic waves at a first location and at a second location, said signals having components of different dominant frequencies, said locations being spaced a distance equal to the velocity of the wave having one dominant frequency multiplied by the time interval corresponding to an odd number of half waves with respect to the other of said dominant frequencies, inverting one of said signals, mixing the other signal with the inverted signal to produce a resultant signal, and delaying one of said signals for said time interval corresponding to an odd number of half waves with respect to the other of said dominant frequencies.

7. A method for eliminating surface wave signals from the output of a seismic recording system, which comprises producing electrical voltages representative of seismic waves at a first location and at a second location, both signals having a component representative of surface waves, said component having a dominant frequency, inverting one of said signals, mixing the inverted signal with the other signal to produce a resultant signal, and delaying one of said signals for an interval equal to the time required for the surface waves to traverse the distance between said locations.

8. A method for eliminating surface wave signals from the output of a seismic recording system which comprises producing electrical voltages representative of seismic waves at a first location and at a second location, both signals having components representative of surface waves and reflected waves, both components having a dominant frequency, said first location being spaced from said second location a distance equal to the velocity of the surface waves multiplied by the time interval corresponding to an odd number of half waves at the dominant frequency of said reflected waves, mixing said voltages to produce a resultant voltage, and delaying one of said voltages for a period equal to said time interval.

RAYMOND G. PIETY.

REFERENCES CITED

The following references are of record in the file of this patent:

UNITED STATES PATENTS

| Number | Name | Date |
|---|---|---|
| 2,281,949 | Ritzmann | May 5, 1942 |
| 2,431,600 | Wolf | Nov. 25, 1947 |
| 2,450,352 | Piety | Sept. 28, 1948 |
| 2,473,469 | Dahn | June 14, 1949 |